US 6,961,493 B2
Nov. 1, 2005

(12) United States Patent
Mitomi et al.

(54) OPTICAL DEVICE

(75) Inventors: Osamu Mitomi, Nagoya (JP); Takenori Ichigi, Konan (JP); Masatsugu Oshima, Nagoya (JP); Jun Okumura, Nagoya (JP); Kenji Aoki, Ogaki (JP); Masataka Yamashita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 24 days.

(21) Appl. No.: 10/123,872

(22) Filed: Apr. 16, 2002

(65) Prior Publication Data
US 2002/0176652 A1 Nov. 28, 2002

(30) Foreign Application Priority Data

Apr. 18, 2001 (JP) .................................. 2001-119892
Sep. 6, 2001 (JP) .................................. 2001-270831

(51) Int. Cl.⁷ .......................... G02B 6/26; G02B 6/42; G02B 6/10
(52) U.S. Cl. ....................... 385/40; 385/45; 385/131
(58) Field of Search ................. 385/14–16, 31, 385/39–42, 45, 51, 129–131

(56) References Cited

U.S. PATENT DOCUMENTS

| 4,776,655 | A |   | 10/1988 | Robertson et al. |        |
|-----------|---|---|---------|------------------|--------|
| 5,418,868 | A | * | 5/1995  | Cohen et al.     | 385/16 |
| 5,623,568 | A | * | 4/1997  | Khan et al.      | 385/45 |
| 6,122,416 | A | * | 9/2000  | Ooba et al.      | 385/16 |
| 6,181,848 | B1| * | 1/2001  | Bruno et al.     | 385/24 |
| 6,377,716 | B1| * | 4/2002  | Veldhuis et al.  | 385/1  |
| 6,393,185 | B1| * | 5/2002  | Deacon           | 385/50 |
| 6,449,404 | B1| * | 9/2002  | Paiam            | 385/16 |
| 6,472,682 | B1| * | 10/2002 | Kuramoto         | 257/14 |

FOREIGN PATENT DOCUMENTS

| EP | 0 987 580 A1 | 3/2000 |
| JP | 60-86530 | 5/1985 |
| JP | 61056329 A | 3/1986 |
| JP | 61067838 A | 4/1986 |
| JP | 62-115102 | 5/1987 |
| JP | 63-25631 | 2/1988 |
| JP | 2-3025 | 1/1990 |
| JP | 11-15028 | 1/1999 |
| JP | 11133254 A | 5/1999 |
| JP | 11237652 A | 8/1999 |
| JP | 2000-180646 | 6/2000 |
| WO | 99/42893 A1 | 8/1999 |
| WO | 01/33267 A1 | 5/2001 |

OTHER PUBLICATIONS

U.S. Appl. No. 09/948,007, filed Sep. 6, 2001, Mitomi et al.

(Continued)

Primary Examiner—Nimeshkumar D. Patel
Assistant Examiner—Peter Macchiarolo
(74) Attorney, Agent, or Firm—Burr & Brown

(57) ABSTRACT

An optical device consisting of a core layer, a first clad layer in contact with the core layer, a second clad layer, third clad layer and at least one electrode for applying a certain voltage or supplying a certain current. The second clad layer is deposited on the third clad layer and the core layer is provided between the first clad layer and the second clad layer. The core layer, first clad layer, second clad layer and third clad layer consist of a material with a negative refractive index variation coefficient, and the third clad layer has a refractive index smaller than that of the second clad layer.

13 Claims, 15 Drawing Sheets

OTHER PUBLICATIONS

Hauffe, Ralf et al., "Crosstalk–Optimized Optical Switching Matrices in Polymers by Use of Redundant Switch Elements", *IEEE Photonics Technology Letters*, vol. 13, No. 3, Mar. 2001, pp. 200–202.

Goh, Takashi et al., "Low Loss and High Extinction Ratio Strictly Nonblocking 16 x 16 Thermooptic Matrix Switch on 6–in Wafer Using Silica–Based Planar Lightwave Circuit Technology", *J. Lightwave Technology*, vol. 19, No. 3, Mar. 2001, pp. 371–379.

Toyama, Masaki, Masanori Koshiba, Yasuhide, Tsuji, "An Integrated Software for Thermo–Optic Waveguides", *1999 nen Denshi Joho Tsuushin Gakkai Sougou Taikai Kouen Ronbunshuu Electronics 1*, (1999) p. 309.

Wang, W. K., et al., "Planar Silica–Glass Optical Waveguides with Thermally Induced Lateral Mode Confinement", *Journal of Lightwave Technology*, (1996), vol. 14, No. 3, pp. 429–436.

* cited by examiner

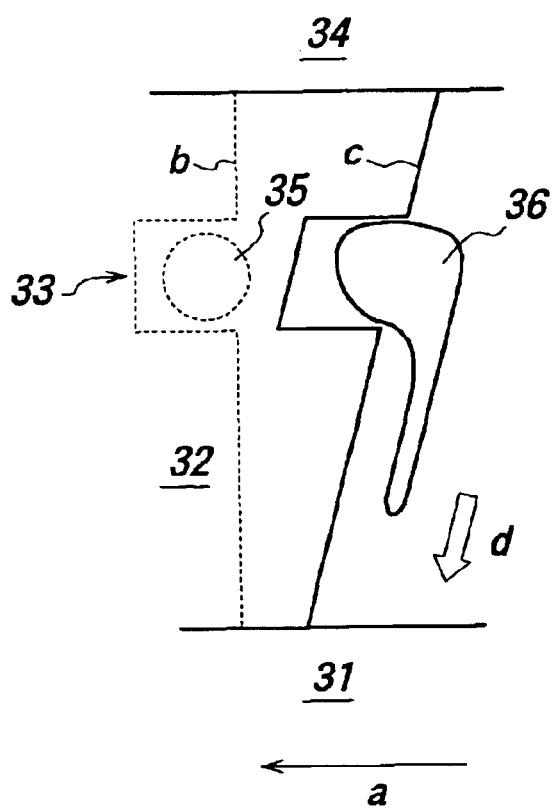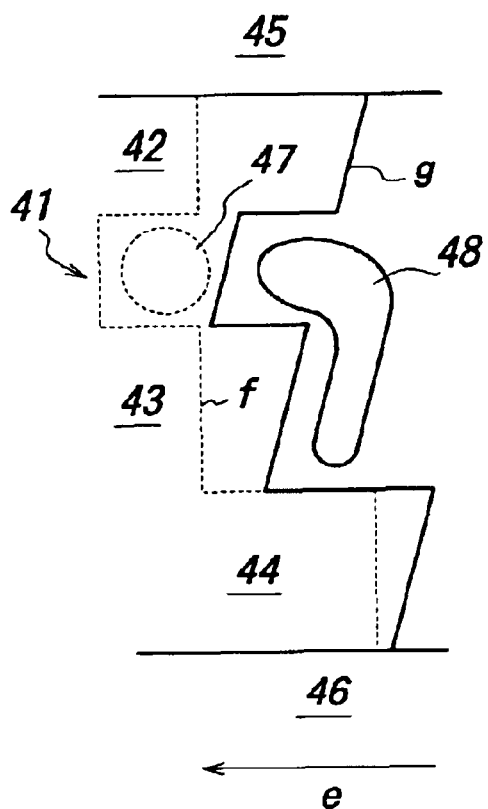

OPTICAL DEVICE

This application claims the benefit of Japanese Application 2001-119,892, filed Apr. 18, 2001, and Japanese Application 2001-270,831, filed Sep. 6, 2001, the entireties of which are incorporated herein by reference.

TECHNICAL FIELD

The present invention relates to an optical device included in a photonic network utilizing a wavelength division multiplexing (WDM) system for example.

BACKGROUND ART

With the development of a photonic network or an optical switching technology, demand has increased for optical devices, for example, an optical switch using an optical waveguide, an optical waveguide device such as an optical modulator and so on tends to be often used.

For example, an optical switch includes a first type using a directional coupler or a Mach-Zehnder interference waveguide and a second type using a branch/cross waveguide.

One example of the optical switch of the first type operates as an analog device wherein, as a voltage applied for the switching operation of the optical switch is increased, the intensity of the output light from the optical switch gradually reduces to around zero. Then as the voltage increases furthermore, the intensity of the output light increases again. On the other hand, the second type of optical switch operates as a digital device in general, and performs on-off operation by applying a voltage not less than a certain value.

The first-type of optical switch performs an on-off operation by changing the phase of an optical wave in a waveguide. Therefore, for example, as the first type of the optical switch can perform the switching operation by only slightly changing the refractive index of a waveguide with an electro-optic effect, the first type of the optical switch has an advantage where the operating voltage is analog and also has a comparatively high operation efficiency.

However, the first-type of optical switch has a disadvantage of a comparatively large size. Also, in order to perform the on-off operation, it is necessary to set the operating voltage of the first type of the optical switch at an appropriate value according to the switching characteristic of the first type of the optical switch. As a result, an electronic circuit for controlling the optical switch has a complex construction, particularly, in the case of a device having a plurality of switch elements such as a matrix switch, it is necessary to perform a fine adjustment of the voltage to each switch.

On the other hand, the second-type of the optical switch has an advantage of having a comparatively small size. As it is enough to apply a voltage not less than a certain value in order to perform the switching operation, the second-type of the optical switch has an advantage of omitting an electric circuit for voltage control and is easier to control compared with the first-type optical switch.

FIG. 1A is a top view of such a first type of the optical switch, and FIG. 1B is a sectional view taken along line I—I of FIG. 1A. This optical device comprises a core layer 1 with a branch waveguide, a clad layer 2, electrodes 3 and 4 arranged over a branched waveguides and a substrate 5 having a heat-sink function, with the clad layer 2 being deposited thereon.

A method of utilizing a thermo-optic (TO) effect of a waveguide material raises the temperature of a waveguide directly under the electrodes 3 and/or 4 by making a proper current flow in the electrodes 3 and/or 4 and thereby changing the refractive index of the waveguide directly under the electrodes 3 and/or 4.

For example, quartz has a property that its refractive index becomes larger with the rise of temperature, namely, a positive refractive index variation coefficient, and can be used as a material for forming the core layer 1 and the clad layer 2. Raising the temperature of a waveguide directly under the electrode 3 or 4 by making a proper current flow in the electrode 3 or 4 makes an input light P0 proceed straight. Keeping the temperature of the waveguide directly under the electrode 3 or 4 comparatively low by making no current flow in the electrode 3 or 4, totally reflects the input light P0. Due to such an operation, the input light P0 to a waveguide is made into an output light P1 or P2 by a straight advance through a waveguide directly under one of the electrodes 3 and 4 or by a total reflection on the face directly under the other of the electrodes 3 and 4.

In the case of changing the refractive index of a waveguide by means of a thermo-optic effect, however, the amount of variation in refractive index is in proportion to a temperature distribution in which an electrode 6 becomes the highest in temperature, as shown in FIG. 2. Accordingly, since a total reflection face of light formed by changing the refractive index of a waveguide has the same form as the form of this temperature distribution and is not perpendicular but inclined to the surface of a clad layer 7, a part of the light reflected by the total reflection face is emitted from the waveguide and therefore the loss of light increases. Such a part of light may be coupled to the optical output waveguide being opposite to the optical input waveguide and thereby the device may be worse in crosstalk.

Also in the case of changing the refractive index of a waveguide by means of an electro-optic effect or in the case of changing the refractive index of a waveguide by means of a plasma effect of semiconductor, namely, a refractive index variation phenomenon caused by a current injection, since the distribution of electric field intensity or the distribution of electric current density is inclined to the surface of the clad layer 7, the loss of light increases.

And in such an optical device, it is preferable to improve the switching characteristic or extinction ratio of the optical device.

An object of the present invention is to provide an optical device which reduces the loss of light and crosstalk.

Another object of the present invention is to provide an optical device which improves the switching characteristic of the optical switch.

Another object of the present invention is to provide an optical device which improves the extinction ratio of the optical device.

SUMMARY OF THE INVENTION

According to a preferred embodiment of the present invention, an optical device is comprised of a core layer, a first clad layer, with the core layer being deposited on a part of a surface of the first clad layer, a second clad layer, with the core layer being provided between the first clad layer and the second clad layer, a third clad layer deposited on the second clad layer and at least one electrode for applying a certain voltage or supplying a certain current. At least two of the core layer, the first clad layer and the second clad layer comprises a material with a positive refractive index variation coefficient, and the third clad layer has a refractive index smaller than that of the second clad layer.

According to the present invention, by applying a certain voltage or supplying a certain current, the second clad layer neighboring an electrode functions as a core layer and suppresses emission of the light propagating through a cross/branch waveguide. As the result, it is possible to reduce the loss and crosstalk of light. A branch/cross waveguide in this specification means a branch waveguide or a cross waveguide.

According to another embodiment of the present invention, an optical device is comprised of a core layer having a cross waveguide, a first clad layer, being in contact with the core layer, a second clad layer, with the core layer being provided between the first clad layer and the second clad layer, a third clad layer with the second clad layer deposited on the third clad layer and at least one electrode for applying a certain voltage or supplying a certain current. The core layer, the first clad layer and the second clad layer comprises a material with a negative refractive index variation coefficient, and the third clad layer has a refractive index smaller than that of the second clad layer.

According to the present invention, by applying a certain voltage or supplying a certain current, the second clad layer neighboring an electrode functions as a core layer and suppresses emission of the light propagating through a cross/branch waveguide. As the result, it is possible to reduce the loss of light and crosstalk.

Preferably, the thickness of the second clad layer is not less than 0.5 $\mu$m, and the standard value of the difference between the refractive index of the third clad layer and that of the second clad layer to the refractive index of the second clad layer is not more than −0.1%. Also, the third clad layer consists of a plurality of layers different in refractive index from one another.

From the viewpoint of reducing a coupling loss, the thickness of the first clad layer is preferably 4 to 40 $\mu$m and more preferably 4 to 15 $\mu$m.

It is preferable to remove a part of the third clad layer corresponding to the location in which the electrode is arranged and to embed a material with a larger refractive index than that of the third clad layer in the part from which a part of the third clad layer has been removed. Thereby, the switching operation of an optical device improves in extinction ratio.

According to another embodiment of the present invention, an optical device is comprised of a core layer, a first clad layer, with the core layer being deposited on a part of a surface of the first clad layer, a second clad layer, with the core layer being provided between the first clad layer and the second clad layer, a third clad layer deposited on the second clad layer and at least one electrode for applying a certain voltage or supplying a certain current. The electrode is arranged so that the electrode crosses the central axis of the core layer making an acute angle with a light propagating through the core layer.

According to the present invention, since it is possible to raise the temperature of the core layer efficiently, a voltage to be applied to an electrode is comparatively low or a current to be supplied to the electrode is comparatively small. As a result, the switching characteristic of an optical device improves.

According to another embodiment of the present invention, an optical device comprises a core layer, a first clad layer, with the core layer being deposited on a part of a surface of the first clad layer, a second clad layer, with the core layer being provided between the first clad layer and the second clad layer, a third clad layer deposited on the second clad layer and at least one electrode for applying a certain voltage or supplying a certain current. The width of the electrode in a direction perpendicular to the central axis of the core layer making an acute angle with a light propagating through the core layer is not more than three times the width of the core layer.

A leakage light at the time of a total reflection in the core layer (a part of evanescent wave power) is concentrated on an area to function as a core layer formed directly under an electrode and is weakened in coupling to a waveguide at the output side. Thereby, in the case that the width of the electrode is smaller than a value within a certain range, since the thickness in the direction of propagation of light in a total reflection area of the core layer is not sufficient, the extinction ratio is lower by a fact that a part of evanescent waves leaks out and is coupled to a waveguide at the output side. On the other hand, in the case that the width of the electrode is larger than a value within a certain range, the width of an area functioning as a core layer gets larger and when a light reaches a waveguide at the output side, evanescent waves in an area functioning as a core layer leak out to a waveguide at the output side and the extinction ratio is lower. Therefore, the optimum range of the width of an electrode depends on the thickness of a clad layer and the width of a core layer, and the maximum extinction ratio can be obtained by making the width of an electrode be not more than three times of the width of the core layer.

It is preferable that the width of the electrode in a direction perpendicular to the central axis of the core layer making an acute angle with a light propagating through the core layer is not less than 0.5 times of the width of the core layer. The core layer has a single mode optical waveguide, for example. Since a core layer having a single mode optical waveguide is comparatively small in sectional area, it has an effect of confining light in a waveguide, the effect being not remarkably strong, and it is called a flat core layer in general.

It is possible to form an optical device in which the core layer has a single mode optical input waveguide, a single mode branch/cross optical waveguide and a single mode optical output waveguide. Accordingly, the electrode is a rectangular electrode disposed in the vicinity of the central part of the single mode branch/cross optical waveguide. The width of the electrode is between not less than 0.2 times and not more than 3 times the width of the waveguide, and the optical device has a function of switching over light so that the light propagates from the single mode branch/cross optical waveguide through the first clad layer again into the single mode branch/cross optical waveguide.

In this case, since the optical confinement of the device is not remarkably strong, even if the width of the electrode is comparatively large relative to the width of the optical waveguide, it is possible to make excess loss sufficiently small and make the extinction ratio of switching comparatively large. The width of an electrode relative to the width of an optical waveguide is determined on the basis of the relation between the temperature of the electrode and a driving power. The branch/cross waveguide in this specification means a branch waveguide or a cross waveguide.

It is more preferable that the horizontal spot size of light propagating through the core layer is not less than 5 $\mu$m. In the case that the horizontal spot size of light propagating through the core layer is not less than 5 $\mu$m, it is possible to make the optical confinement effect of the core layer, namely, the waveguide, strong and make the diffraction of light in a branch/cross waveguide of the core layer small, and reduce the loss of light and crosstalk in the optical device.

BRIEF DESCRIPTION OF THE DRAWINGS

FIG. 5 is a graph showing the distribution of refractive index in each of an optical device of the prior art and an optical device according to the present invention;

DETAILED DESCRIPTION OF THE INVENTION

Embodiments of an optical device according to the present invention are described in detail with reference to the drawings. In the following embodiments, an optical device using a flat core layer is described, but the present invention is not limited to this so long as it is not described in particular.

Figure 1A:
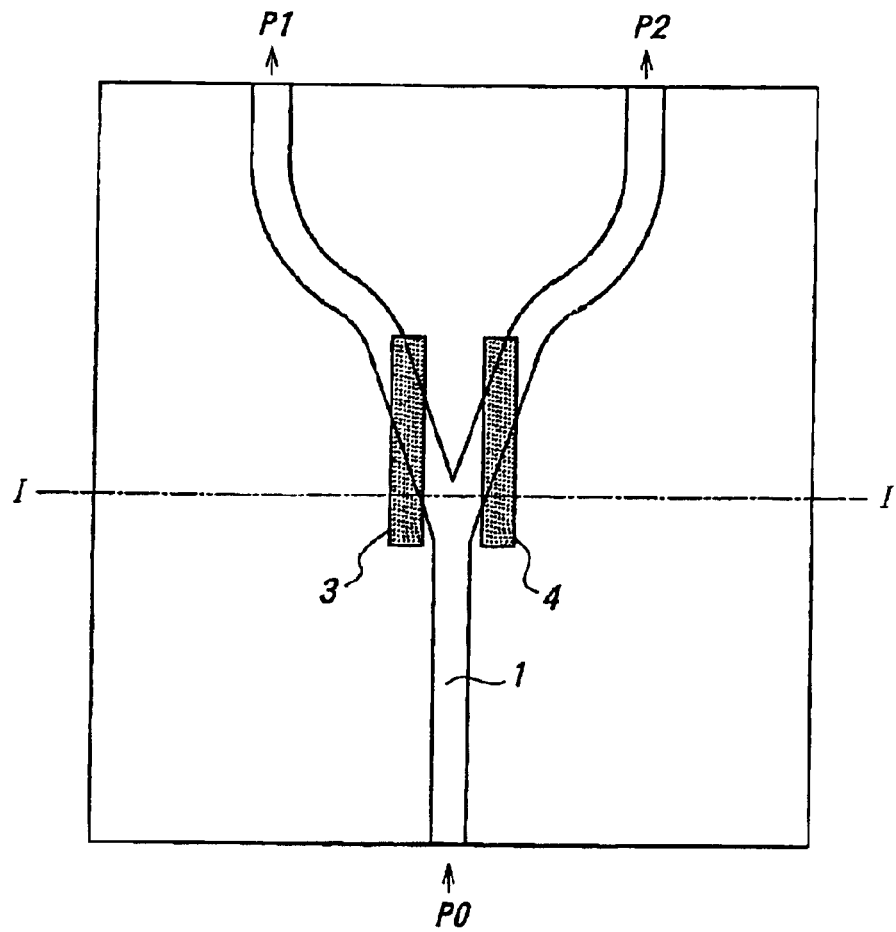
FIG. 1 is a diagram showing a conventional optical device.
Figure 1B:
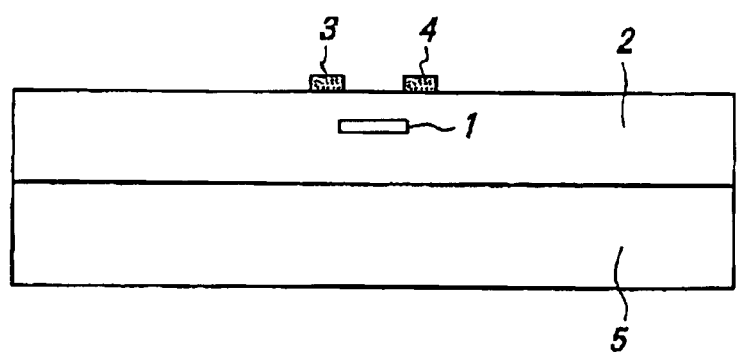
Figure 2:
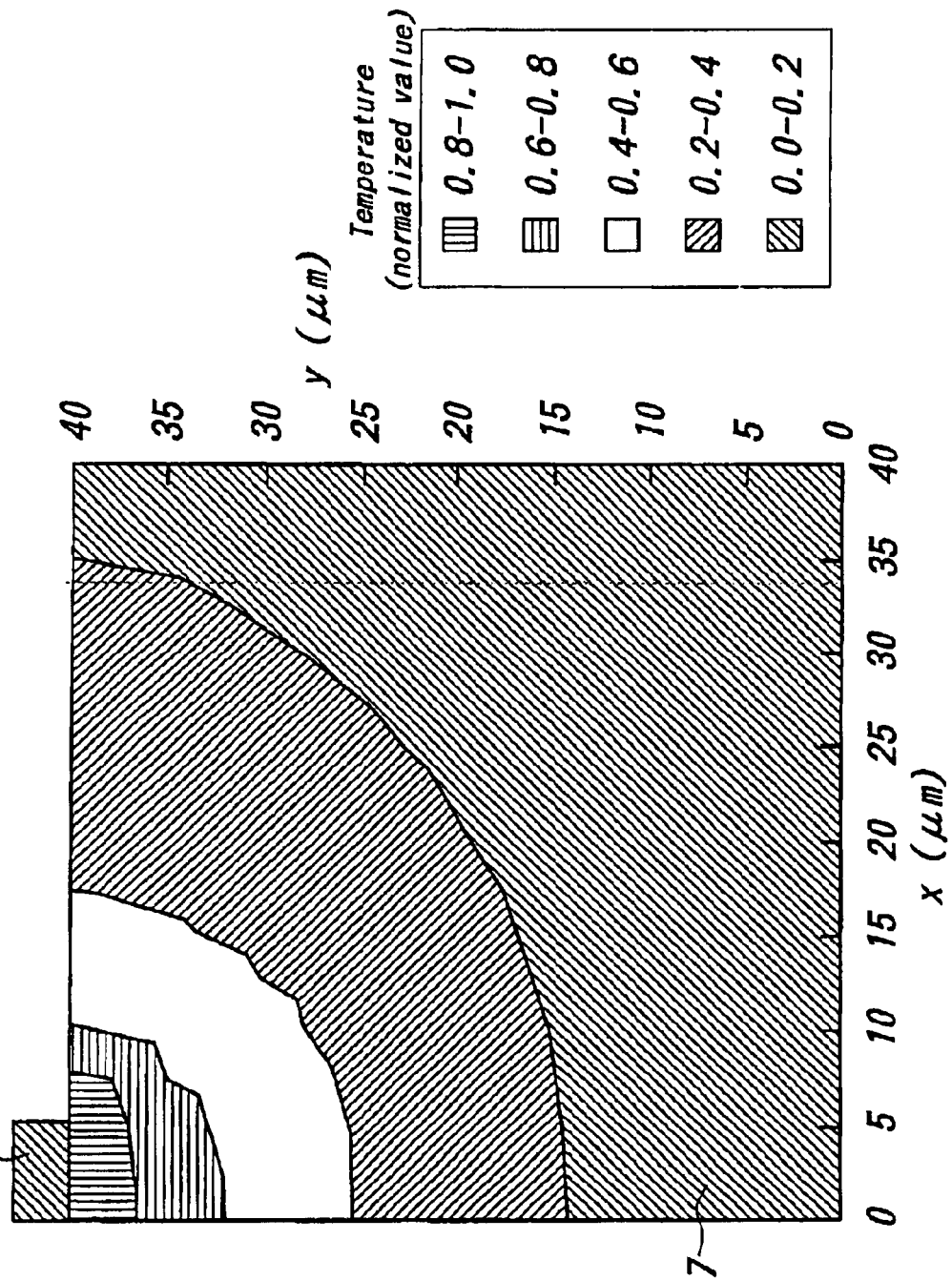
FIG. 2 is a graph showing a temperature distribution in a conventional optical device.
Figure 3A:
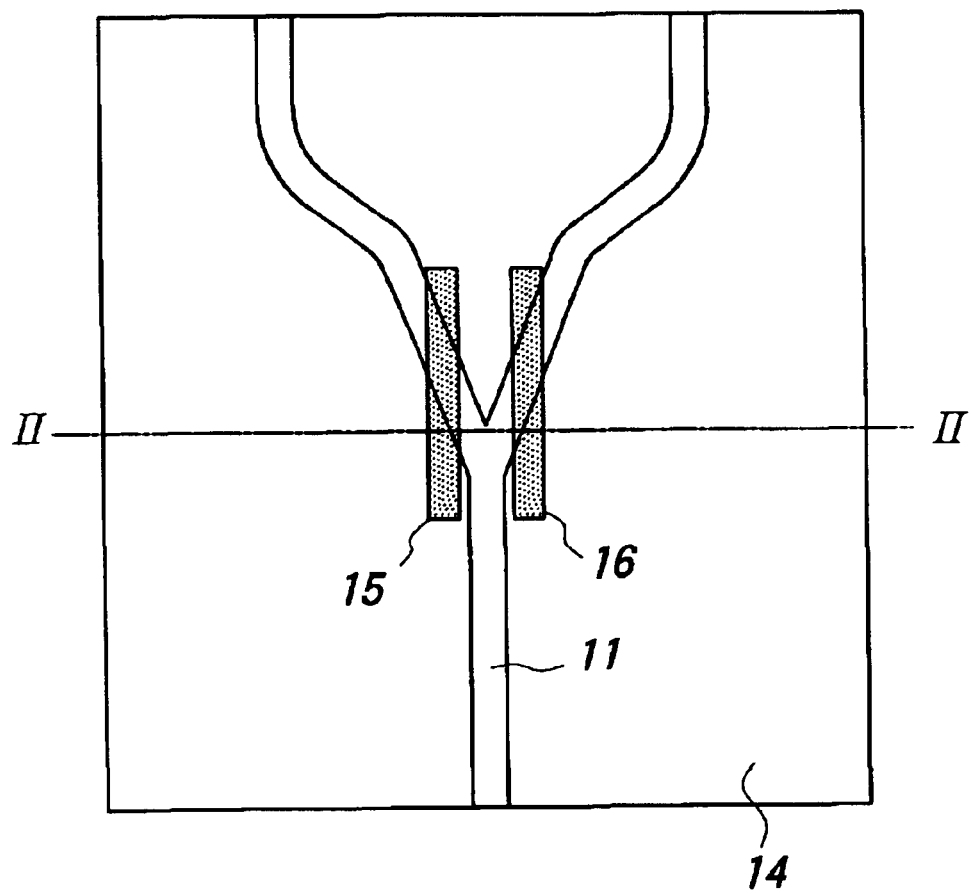
FIG. 3 is a diagram showing a first embodiment of an optical device according to the present invention.
Figure 3B:
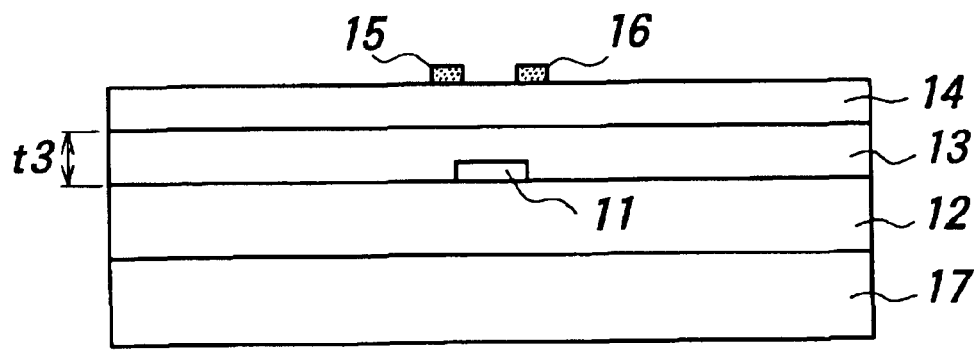

FIG. 3A shows a first embodiment of an optical device according to the present invention, and FIG. 3B is a sectional view of it taken along line II—II. This optical device is provided with a core layer 11 having a branch waveguide, a first clad layer 12, with the core layer 11 being deposited on a part of the surface of the first clad layer 12, a second clad layer 13, with the core layer 11 being provided between the first clad layer 12 and the second clad layer 13, a third clad layer 14 deposited on the second clad layer 13, heating electrodes 15 and 16 for applying a certain voltage or supplying a certain current, and a substrate 17 with a heat-sink function.

In the embodiment, at least one of the core layer 11 and the first and second clad layers 12 and 13 comprises an optical material with a positive refractive index variation coefficient such as a glass material, a polymer material, $LiNbO_3$ or PLZT. The third clad layer 14 has the refractive index smaller than that of the second clad layer 13.

Figure 4A:
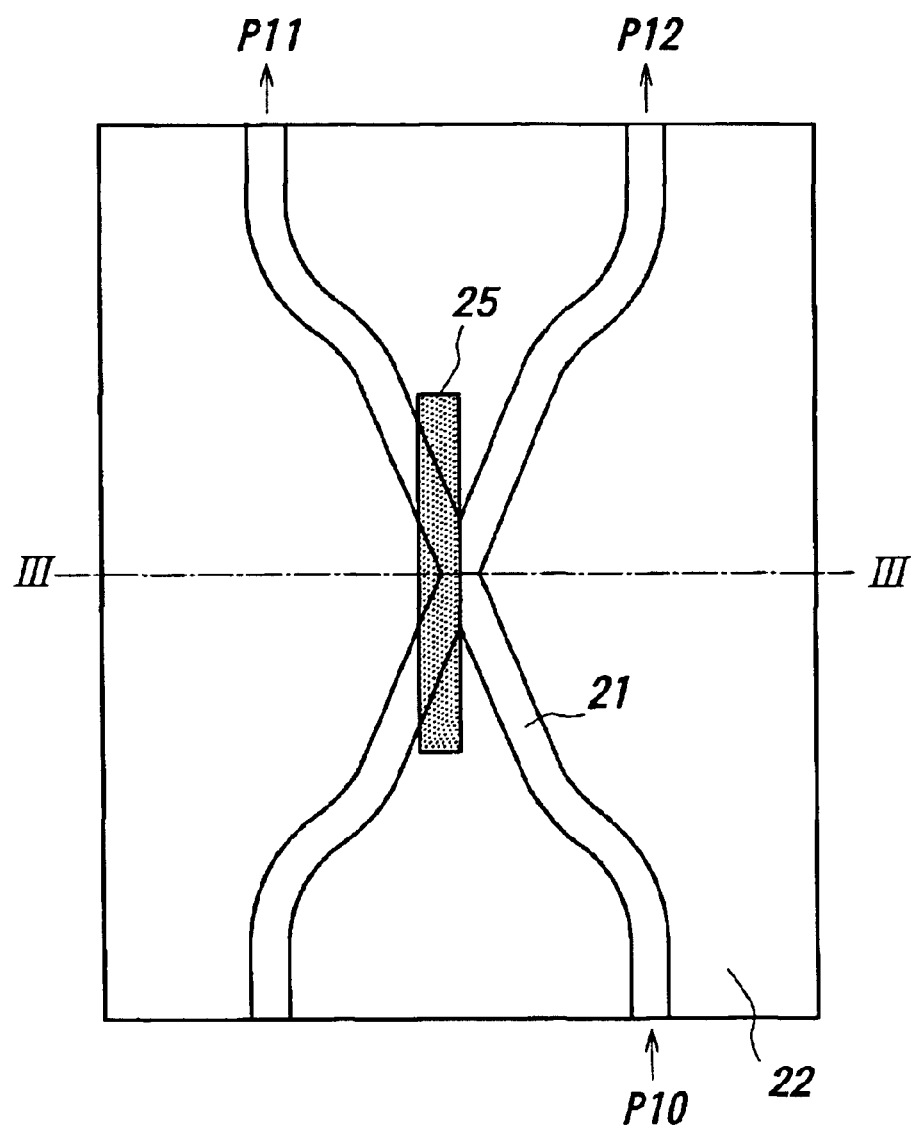
FIG. 4 is a diagram showing a second embodiment of an optical device according to the present invention.
Figure 4B:
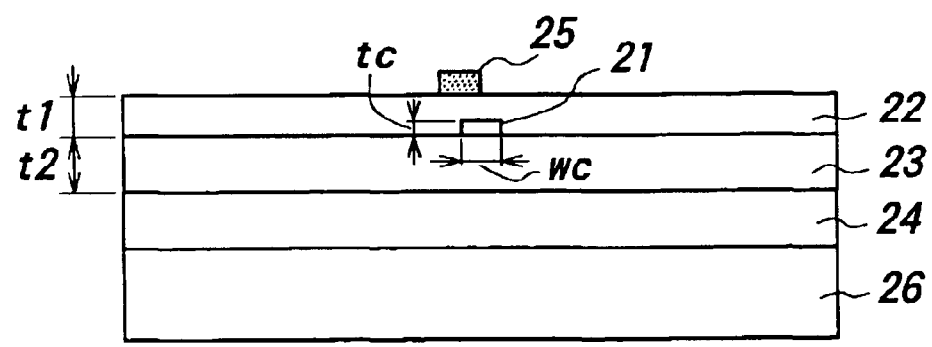

FIG. 4A shows a second embodiment of an optical device according to the present invention, and FIG. 4B is a sectional view taken along line III—III of FIG. 4A. This optical device is provided with a core layer 21 having a cross waveguide, a first clad layer 22 being in contact with the core layer 21, a second clad layer 23, with the core layer 21 being provided between the first clad layer 22 and the second clad layer 23, a third clad layer 24, with the second clad layer 23 being deposited on the third clad layer 24, an electrode 25 for applying a certain voltage or supplying a certain current, and a substrate 26 with a heat-sink function.

In the embodiment, at least one of the core layer 21 and the first and second clad layers 22 and 23 comprise an optical material with a negative refractive index variation coefficient such as polyimide, namely, with a property in which the refractive index decreases as the temperature increases. The third clad layer 24 has the refractive index smaller than that of the second clad layer 23.

In the case of using a polymer as a material for forming the core layers 11 and 21 in the first and second embodiments described above, it is possible to set its refractive index by properly adjusting its composition and combination, and set optionally its thickness by adjusting the viscosity of the polymer material before being hardened or by adjusting the rotation speed of a spinner. It is possible to form the core layer 11 and 21 by means of a conventional photolithography technique or a film growing technique of an optical material.

Next, the principle and effects of the second embodiment are described with reference to FIGS. 5 to 7.

FIG. 5A shows the distribution of refractive index in the vicinity of a cross waveguide of a conventional optical device. In FIG. 5A, a clad layer 32 with a negative refractive index variation coefficient is formed on a substrate 31. The clad layer 32 surrounds a core layer 33 and changes the refractive index of a waveguide by means of a heating electrode 34. The refractive index is represented so as to get larger as proceeding in the direction a.

In a state where the electrode 34 is not heated, the distribution of refractive index in the clad layer 32 and the core layer 33 becomes a distribution as shown by a dashed line b, and a wave-guided light 35 proceeds along the core layer 33. On the other hand, in a state where the electrode 34 is heated, the distribution of refractive index in the clad layer 32 and the core layer 33 becomes a distribution as shown by a solid line c. As a result, the wave-guided light 36 is unevenly distributed at the substrate 31 side of the clad layer 32 where the refractive index is relatively higher, and a part of the light 36 is emitted downward as shown by an arrow d to cause a large loss.

FIG. 5B shows the distribution of refractive index in the vicinity of a cross waveguide of the optical device according to the present invention. The optical device in FIG. 5B is provided with a core layer 41 having a cross waveguide, a first clad layer 42 in contact with the core layer 41, a second clad layer 43, with the core layer 41 being provided between the first clad layer 42 and the second clad layer 43, a third clad layer 44, with the second clad layer 43 being deposited on the third clad layer 44, an electrode 45 for applying a certain voltage or supplying a certain current, and a substrate 46 with a heat-sink function.

In the embodiment, at least one of the core layer 41 and the first and second clad layers 42 and 43 comprises an optical material with a negative refractive index variation coefficient such as polyimide. The third clad layer 44 has the refractive index smaller than that of the second clad layer 43. The refractive index is represented so as to get larger as proceeding in a direction e.

In a state where the electrode 45 is not heated, the distribution of refractive index in the core layer 41 and the clad layers 42, 43 and 44 becomes a distribution as shown by a dashed line f, and a wave-guided light 47 proceeds along the core layer 41. On the other hand, in a state where the electrode 45 is heated, the distribution of refractive index in the core layer 41 and the clad layers 42, 43 and 44 becomes a distribution as shown by a solid line g. As a result, a part of a wave-guided light 48 leaks out to the second clad layer 43, but is kept in the second clad layer 43 by the third clad layer 44. The wave-guided light 48 leaves the electrode 45 while propagating through a waveguide and returns gradually to the core layer 41. Thereby, the emission of the wave-guided light is suppressed and the loss gets smaller. According to the present invention, the second clad layer 43 functions as a core layer when the electrode 45 is heated.

Figure 6:
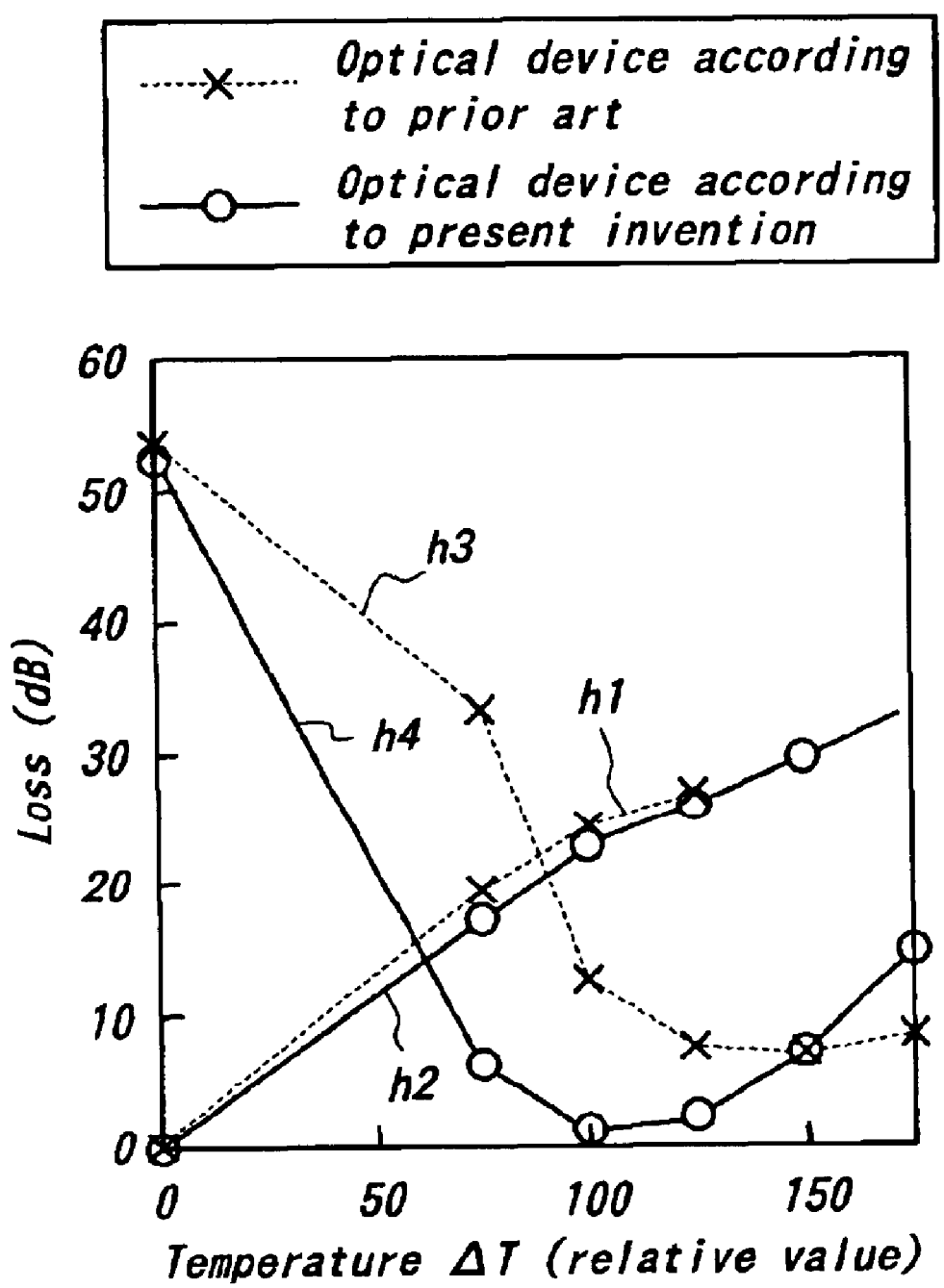
FIG. 6 is a graph showing the relation between the temperature of an electrode and the loss of an optical device according to the present invention.

FIG. 6 shows the relation between the temperature of an electrode and the loss in the optical device of the prior art and the optical device according to the present invention. In FIG. 6, h1 represents the loss of an output light P11 which has proceeded straight ahead relative to an input light P10 in the optical device of the prior art, h2 represents the loss of an output light P11 which has proceeded straight ahead relative to an input light P10 in the second embodiment, h3 represents the loss of an output light P12 reflected relative to an input light P10 in the optical device of the prior art, and h4 represents the loss of an output light P12 reflected relative to an input light P10 in the second embodiment. Temperature $\Delta T$ (relative value) means a relative temperature difference of an electrode relative to a substrate (heat sink). As known from FIG. 6, the loss of an output light P12 reflected relative to an input light P10 in the optical device of the second embodiment is within a temperature range of 0 to 150° C. and is smaller in comparison with the optical device of the prior art.

In this case it is assumed that the thicknesses t1 and t2 of the first and second clad layers 22 and 23 are 10 $\mu$m and 8 $\mu$m, respectively, in the optical device of the second embodiment. Its waveguide adopts a composition satisfying a single mode condition and uses a flat core layer 21 having a comparatively weak effect of confining light in order to suppress the crosstalk in the crossing portion. The thickness tc and width wc of the core layer 21 are 2.5 $\mu$m and 16 $\mu$m, respectively, and in the case that the refractive indexes of the core layer 21 and the second clad layer 23 are assumed to be nc and ns2, respectively, the standard value $\Delta Nc$ (=(nc−ns2)/ns2) of a refractive index difference between the core layer 21 and the second clad layer 23 to the second clad layer 23 is 0.2%. The horizontal spot size of light propagating through the cross waveguide is not less than 5 $\mu$m. Further, in the case of assuming the refractive index of the third clad layer 24 as ns3, the standard value $\Delta Ns$ (=(ns3−ns2)/ns2) of a refractive index difference between the third and second clad layers 24 and 23 to the refractive index of the second clad layer 23 is set at −0.5%. On the other hand, an optical device of the prior art has been set so as to have the same condition as the optical device of the second embodiment except that the clad layers 22, 23 and 24 are the same in refractive index.

When the electrode 25 is not heated, an input light P10 is waveguided with a comparatively low loss and crosstalk. When the temperature of the cross waveguide is raised to a certain value by heating the electrode 25, a switching operation in which the output light P11 is switched over to the output light P12 is performed. In the case of the conventional optical device, the output light P12 reduces the loss by only a degree of 10 dB to produce a large loss at the time of a switching operation. On the other hand, in the case of the optical device of the second embodiment, since the second clad layer 23 functions as a core layer when the electrode 25 is heated as explained with reference to FIG. 5B, although a light confining effect of the core layer 21 is comparatively weak, the loss is reduced to not more than 1 dB.

Also, for example, in the case of the optical switch having a small core layer in which the standard value of a refractive index difference $\Delta Nc$ is 0.3% and the thickness tc and width wc of the core layer 21 are respectively 3 to 4 $\mu$m or so, a similar effect can be obtained. In this case, the horizontal and vertical sizes of light propagating through the cross waveguide each are not less than 5 $\mu$m. Also, in the case of a single mode waveguide structure having an ordinary form, a similar effect can be obtained.

Next, the thickness of a clad layer adjacent to the third clad layer, the thickness t3 of the second clad layer 13 in the first embodiment and the thickness t2 of the second clad layer 23 in the second embodiment are described.

Figure 7:
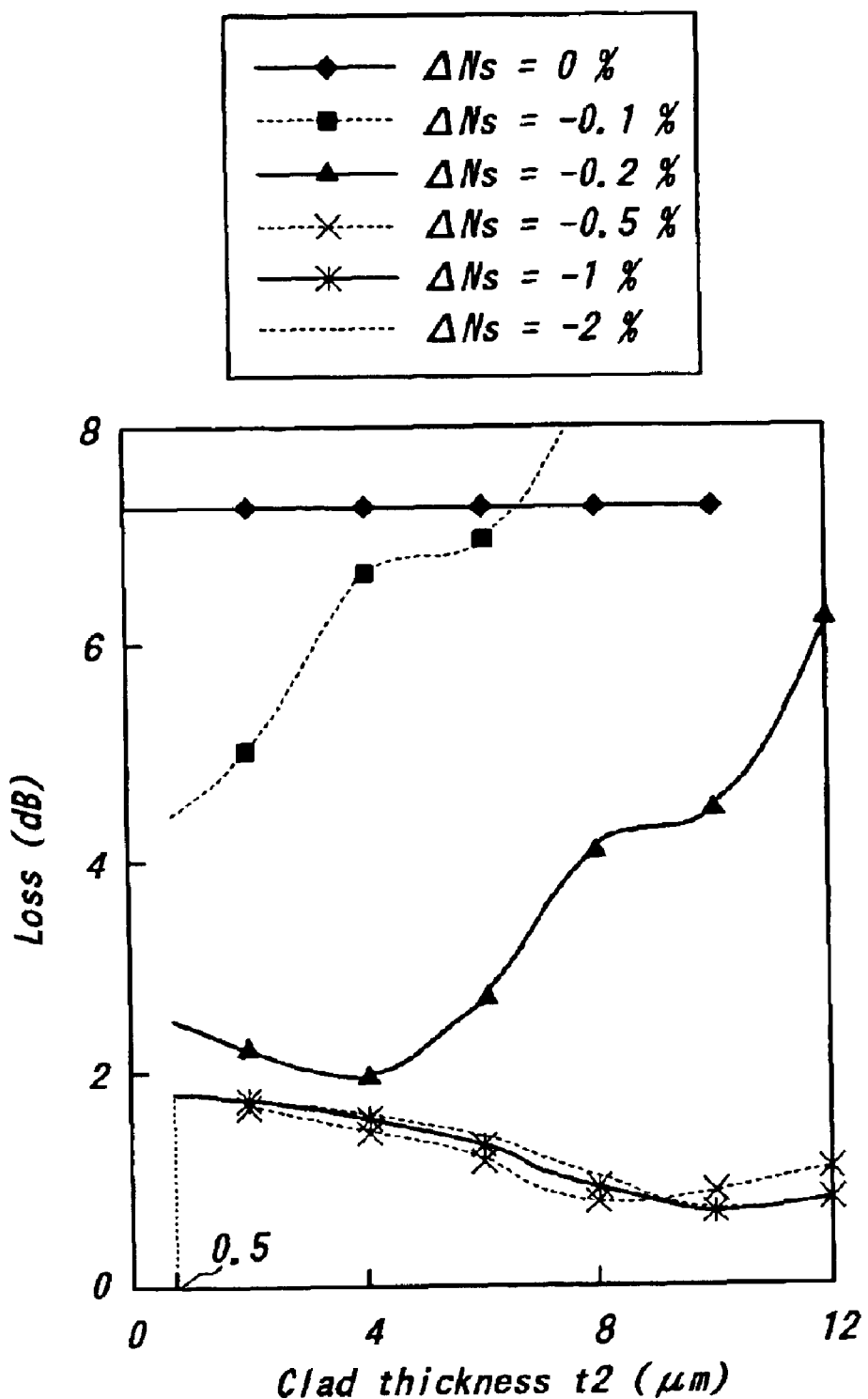
FIG. 7 is a graph showing the dependence of an optical loss characteristic in a crossing portion at the time of a switching operation of an optical device of FIG. 4 upon a refractive index difference ΔNs and a clad layer thickness.

FIG. 7 shows the dependence of the optical loss characteristic in a crossing portion at the time of a switching operation of the optical device of FIG. 4 upon a refractive index difference, $\Delta Ns$ and a clad layer thickness. In this case, the optical device of FIG. 4 is assumed to have a waveguide adopting a composition satisfying a single mode condition.

As shown in FIG. 7, in the case of the conventional optical device, namely, in the case that the clad layers 22, 23 and 24 are the same in refractive index as one another, the loss is about 7 dB regardless of the thickness t2 of the clad layer 23.

On the other hand, in the case of the optical device of the second embodiment, namely, in the case that the third clad layer 24 is different in refractive index from the second clad layer 23, when the standard value $\Delta Ns$ of a refractive index difference is in the range of −0.1% to −1%, the loss becomes lower as the absolute value of the standard value $\Delta Ns$ of a refractive index difference becomes larger, and when the standard value $\Delta Ns$ of a refractive index difference becomes not more than −1%, an effect of reducing the loss is nearly saturated. These phenomena are explained as described below.

In the case that thickness t2 is remarkably small in the optical device according to the second embodiment, a fact that there is the third clad layer 24 lower in refractive index than the second clad layer 23 distorts a field form of light propagating through a waveguide to make the emission of light relatively large. Particularly in the case that the absolute value of a refractive index difference $\Delta Ns$ is comparatively large, when thickness t2 becomes zero (this corresponds to the conventional optical device) or remarkably small, since the distribution of the refractive index is asymmetric in the clad layers 22, 23 and 24, the waveguide comes into a cutoff state and does not function as a waveguide when the electrode 25 is in a not-heated state.

On the other hand, in the case that thickness t2 is remarkably large, in the vicinity of the electrode 25 being in a heated state, a part of light which has leaked out to the second clad layer 23 is not returned to the core layer 21 but emitted, and thus the loss becomes larger.

Accordingly, it is possible to reduce the loss by properly determining the thickness t2 according to the strength of a light confining effect of the core layer 21 and the magnitude. of the standard value ΔNs of a refractive index difference. Preferably, thickness t2 is not less than 0.5 μm, and the standard value ΔNs of a refractive index difference is not more than −0.1%.

Figure 8A:
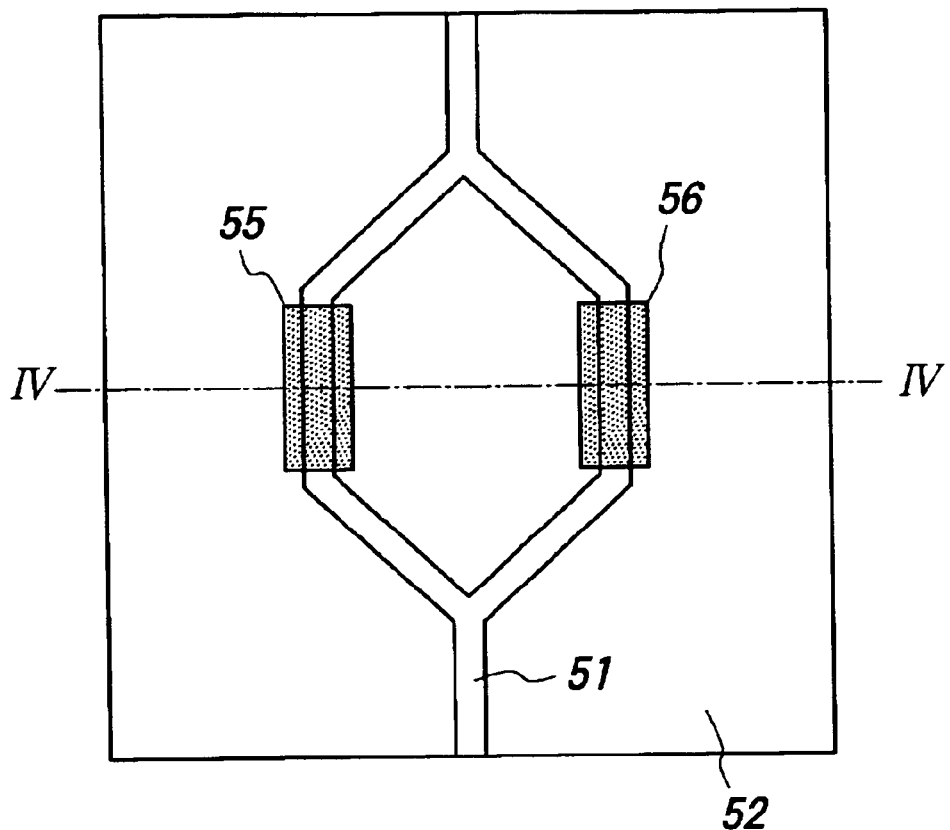
FIG. 8 is a diagram showing a third embodiment of an optical device according to the present invention.
Figure 8B:
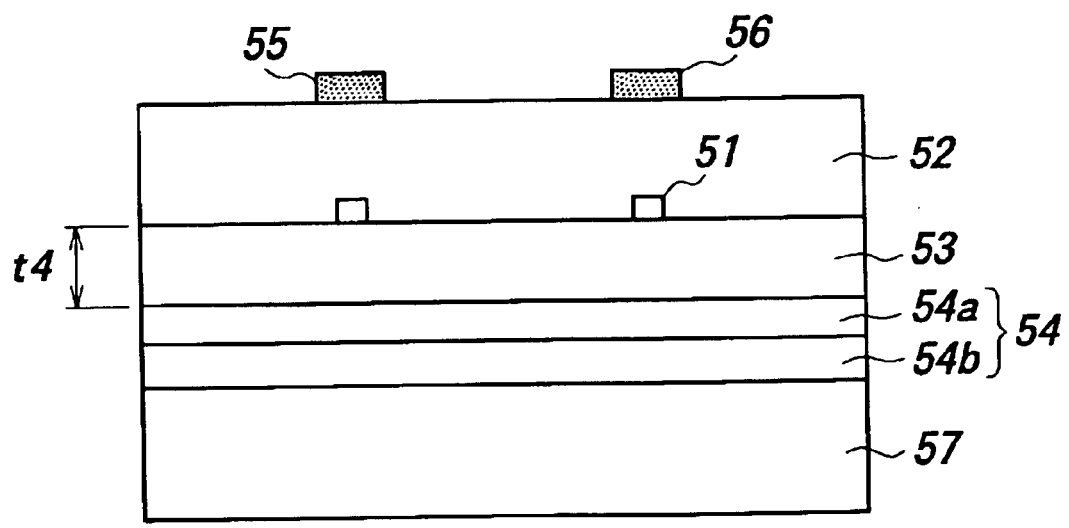

FIG. 8A shows a third embodiment of the optical device according to the present invention, and FIG. 8B is a sectional view of it taken along line IV—IV. In this embodiment a waveguide-type optical modulator is used as the optical device, and this optical device is provided with a core layer 51 having a Mach-Zehnder (optical interferometer) type waveguide, a first clad layer 52 in contact with the core layer 51, a second clad layer 53, with the core layer 51 being provided between the first clad layer 52 and the second clad layer 53, a third clad layer 54, with the second clad layer 53 being deposited on the third clad layer 54, electrodes 55 and 56 for applying a certain voltage or supplying a certain current, and a substrate 57 with a heat-sink function.

In the embodiment, at least one of the core layer 51 and the first and second clad layers 52 and 53 comprises an optical material having a negative refractive index variation coefficient. The third clad layer 54 has the refractive index smaller than that of the second clad layer 53. The electrodes 55 and 56 are arranged above a phase change domain waveguide of the core layer 51. The third clad layer 54 consists of two sub-clad layers 54a and 54b, and the sub-clad layer 54a has the refractive index larger than that of the sub-clad layer 54b. The third clad layer 54 may consist of three sub-clad layers, and in this case, a sub-clad layer closer to the substrate 57 out of these sub-clad layers has the refractive index smaller than that of a sub-clad layer farther from the substrate 57.

According to the embodiment, even in the case that the thickness t4 of the second clad layer 53 is remarkably small, it is possible to avoid the cutoff state of a waveguide by forming the third clad layer out of not less than two sub-clad layers different in refractive index from one another so that a sub-clad layer closer to the substrate has a smaller refractive index. As a result, it is possible to form the optical device being advantageous in reducing the loss. In the case of forming the third clad layer out of not less than two sub-clad layers different in refractive index from one another in the first embodiment, the refractive index of a sub-clad layer out of these sub-clad layers closer to the substrate is larger than that of a sub-clad layer farther from the substrate.

Figure 9A:
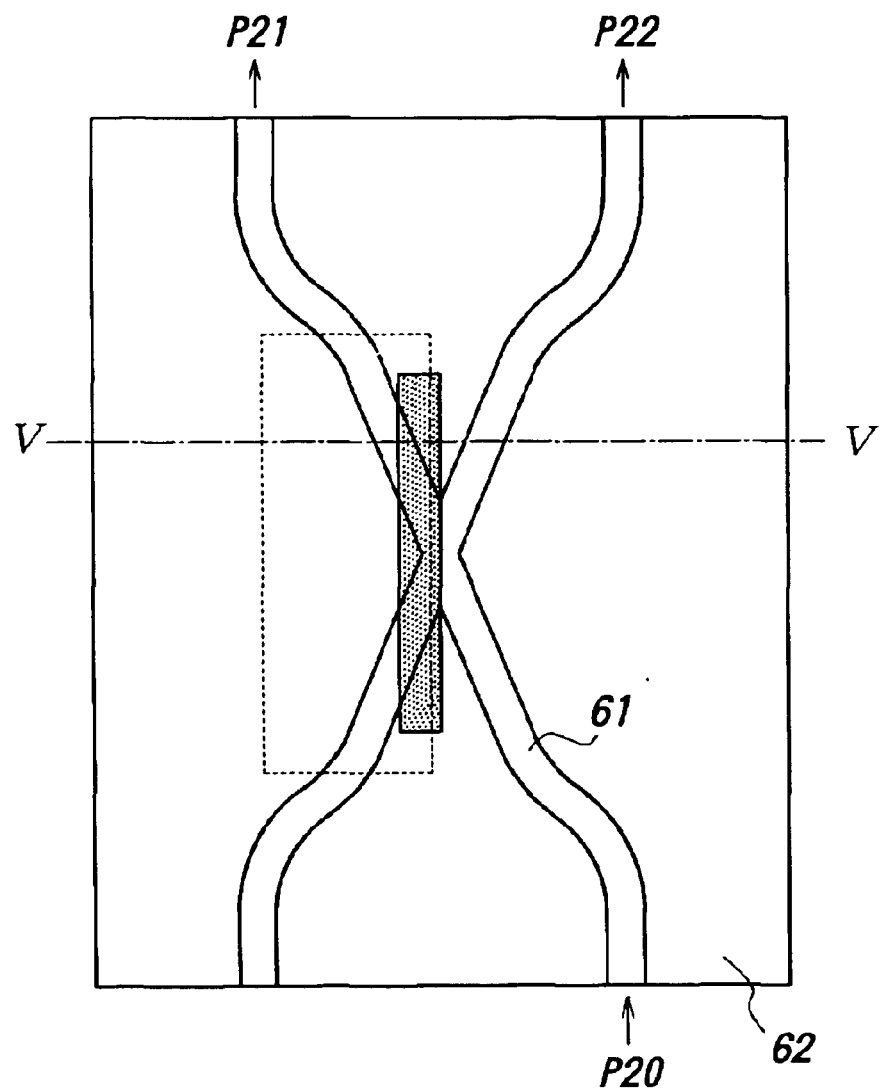
FIG. 9 is a diagram showing a fourth embodiment of an optical device according to the present invention.
Figure 9B:
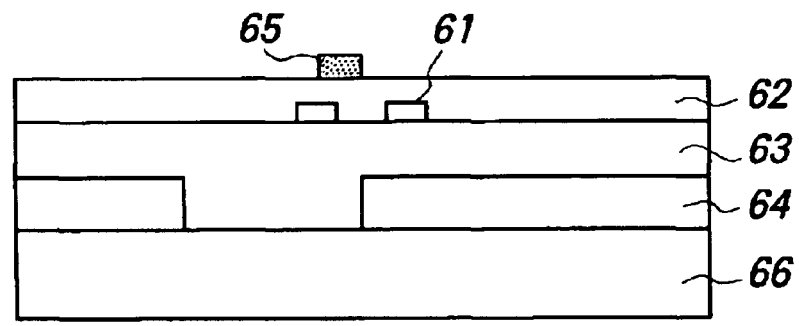

FIG. 9A shows a fourth embodiment of the optical device according to the present invention, and FIG. 9B is a sectional view of it taken along line V—V. This optical device is provided with a core layer 61 having a cross waveguide, a first clad layer 62 in contact with the core layer 61, a second clad layer 63, with the core layer 61 being provided between the first clad layer 62 and the second clad layer 63, a third clad layer 64, with the second clad layer 63 being deposited on the third clad layer 64, an electrode 65 for applying a certain voltage or supplying a certain current, and a substrate 66 with a heat-sink function.

In the embodiment, at least one of the core layer 61 and the first and second clad layers 62 and 63 comprises an optical material with a negative refractive index variation coefficient, and the third clad layer 64 has the refractive index smaller than that of the second clad layer 63. A part of the third clad layer 64 (shown by a dashed line in FIG. 9A) corresponding to an area where the electrode is disposed is removed and an optical material for forming the second clad layer 63 is embedded in the removed part. Hereupon, an effect of the present invention can be realized by selecting a material with a refractive index larger than that of the third clad layer 64 as a material to be embedded in the removed part.

According to the embodiment, since a part of the third clad layer 64 corresponding to an area where the electrode 65 is disposed has been removed, an output light P21 which has proceeded straight ahead relative to an input light P20 generates a remarkable optical emission in this part, as described with reference to FIG. 5A. As the result, the extinction ratio P21/P20 at the time of a switching operation is improved. On the other hand, an output light P22 reflected relative to the input light P20 can make the loss comparatively lower thanks to the third clad layer 64. As the result, a high-performance optical device can be realized.

Figure 11:
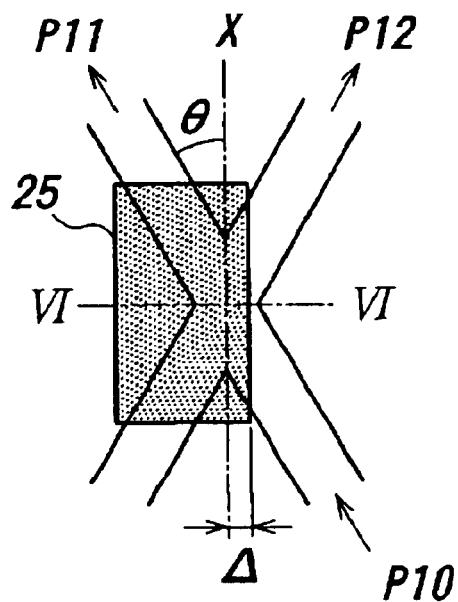
FIG. 11 is a diagram for explaining FIG. 10.
Figure 12:
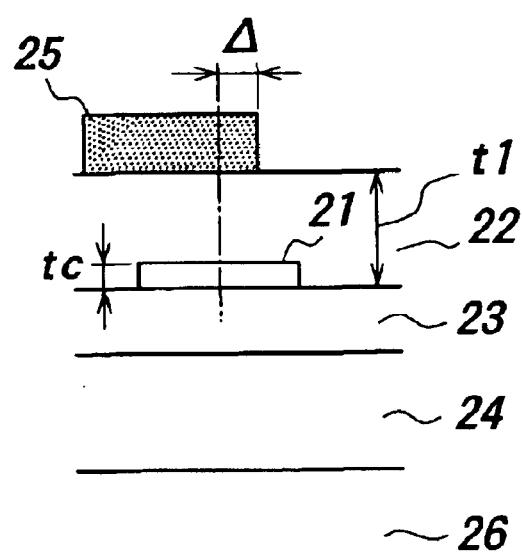
FIG. 12 is a sectional view taken along line VI—VI of FIG. 11.

Next, the relation among the position of an electrode relative to the central position of a branch/cross waveguide, the loss and the temperature. of heating the electrode is described with reference to FIGS. 10 to 12. In this case, the optical device (t1=10 μm, t2=8 μm) in FIG. 4 is used as the optical device, and the amount of displacement Δ of the electrode relative to the central axis X making an acute angle with a light propagating. through the cross waveguide is described.

Figure 10:
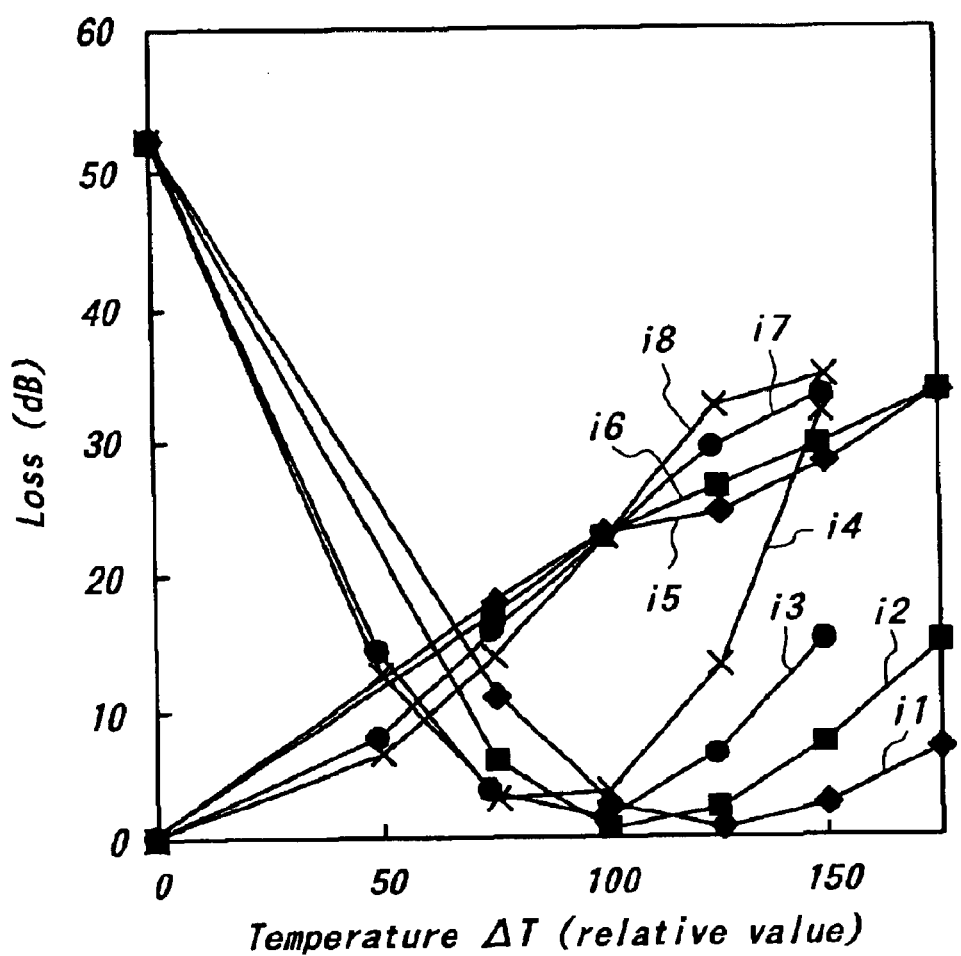
FIG. 10 is a graph showing the relation between the position of an electrode relative to the central position of a branch/cross waveguide and the loss.

In FIG. 10, curves i1, i2, i3 and i4 each represent the loss of an output light P11 reflected relative to an input light P10 in the case that the amount of displacement Δ is 0, 4, 8 and 12 μm, respectively, and curves i5, i6, i7 and i8 each represent the loss of an output light P11 which has proceeded straight ahead relative to an input light P10 in the case that the amount of displacement Δ is 0, 4, 8 and 12 μm, respectively.

As known from FIG. 10, the temperature ΔT of heating the electrode 25 (relative value) becomes lower as the amount of displacement Δ becomes larger. The reason is that it is possible to raise the temperature of a waveguide by the electrode 25 efficiently as the amount of displacement Δ becomes larger. However, since the loss of switching increases when the amount of displacement Δ is too large, the amount of displacement Δ is set at a proper value on the basis of the relation between the temperature of heating the electrode 25 and the loss. The present invention determines the optimum amount of displacement Δ in consideration of a material for the waveguide, the thermal conductivity of it and the thickness t1 of the first clad layer 22. Also, in the case of a branch waveguide, the relation among the amount of displacement Δ, the loss and the temperature of heating the electrode as described with reference to FIGS. 10 to 12 is applicable.

Next, the relation between the width of an electrode in a direction perpendicular to the central axis of a branch/cross waveguide making an acute angle with a light propagating through the branch/cross waveguide and the width of a core layer is described with reference to FIGS. 13 and 14. In this case, an optical device (t1=10 μm, t2=8 μm) in FIG. 4 is used as an optical device, and the width We of the electrode 25 relative to the central axis making an acute angle θ with a light propagating through the cross waveguide and the width Wc of the core layer are described.

Figure 13:
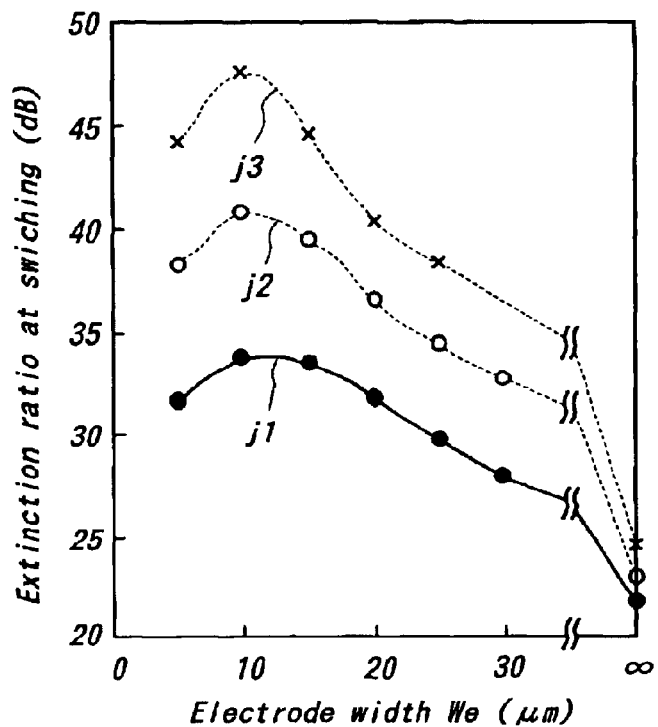
FIG. 13 is a graph showing the relation between the width of an electrode in a direction perpendicular to the central axis of a branch/cross waveguide making an acute angle with a light propagating through the branch/cross waveguide and the extinction ratio of switching.
Figure 14:
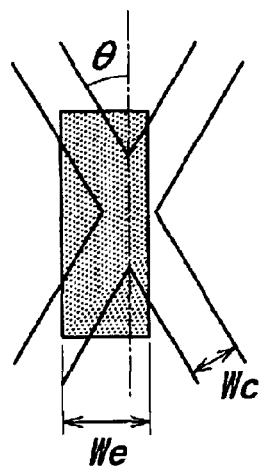
FIG. 14 is a diagram for explaining FIG. 13.

In FIG. 13, curves j1, j2 and j3 each represent the extinction ratio of switching relative to the width We of the electrode in the case that the temperature of the electrode 25 is 90, 100 or 110° C. In the case that the width We of the electrode 25 is the same, the extinction ratio tends to increase as the temperature of the electrode 25 increases. In the case that the temperature of the electrode 25 is the same, the maximum extinction ratio can be obtained when the width We of the electrode 25 is from 10 to 15 μm.

A leakage light (a part of evanescent wave power) at the time of the total reflection in the cross waveguide is concentrated on an area functioning as a core layer formed directly under the electrode 25 and is made weaker in coupling to a waveguide at the output side. Due to this, in the case that the width We of the electrode 25 is smaller than a value within a certain range, since the thickness in the direction of propagation of light in the total reflection area of the cross waveguide is not sufficient, a part of evanescent waves leaks out and the leakage light is coupled to the waveguide at the output side and thereby the extinction ratio decreases. On the other hand, in the case that the width We of the electrode 25 is larger than a value within a certain range, the width of an area functioning as a core layer becomes larger, and when a light reaches the waveguide at the output side, evanescent waves in the area functioning as a core layer leak out to the waveguide at the output side and thereby the extinction ratio decreases. Therefore, the optimum range of the width We of the electrode 25 depends on the thickness of the clad layers 22, 23 and 24 and the width Wc of the core layer 21, and the maximum extinction ratio can be obtained by making the width We of the electrode 25 be not more than three times the width Wc of the core layer 21. This is applicable also to a branch waveguide. In this case, it is preferable to make the width We of the electrode 25 be not less than 0.5 times of the width Wc of the core layer 21.

Next, the relation between the thickness of the first clad layer (for example, the clad layer 12 of FIG. 3) and the loss of coupling is described with reference to FIGS. 15 and 16.

Figure 15:
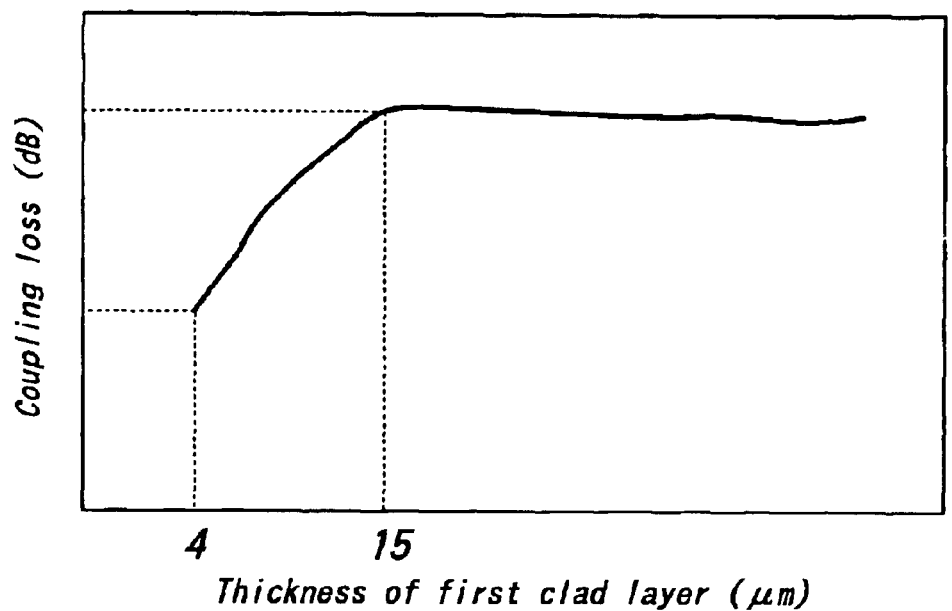
FIG. 15 is a graph showing the relation between the thickness of the first clad layer and the coupling loss.
Figure 16:
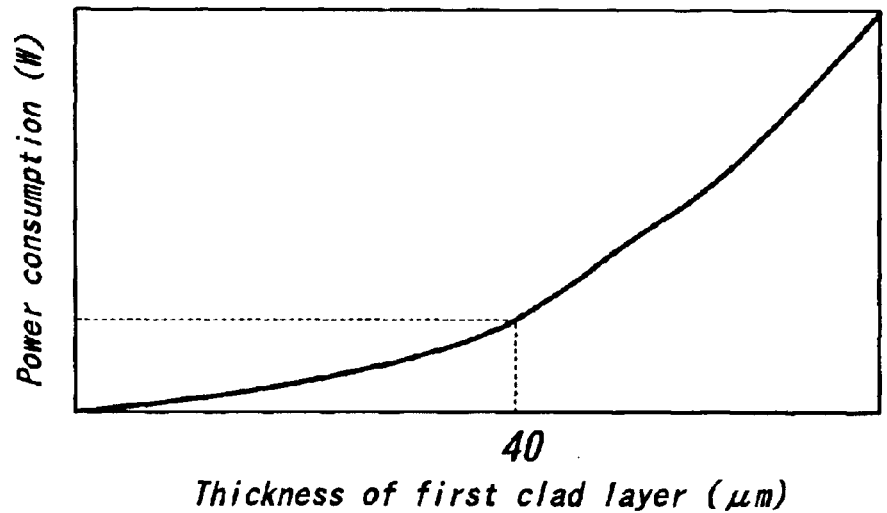
FIG. 16 is a graph showing the relation between the thickness of the first clad layer and the power consumption.

As shown in FIG. 15, the coupling loss decreases as the thickness of the first clad layer is made smaller than 15 μm. When the thickness of the first clad layer is made smaller than 4 μm, however, there is the possibility that light leaks out from the first clad layer and the propagation loss gets worse. As the result, it is preferable to make the thickness of the first clad layer be not less than 4 μm.

On the other hand, when the thickness of the first clad layer is not less than 15 μm, the coupling loss comes into a substantially saturated state and a great reduction of the connection loss cannot be achieved. And as shown in FIG. 16, when the thickness of the first clad layer exceeds 40 μm, the ratio of increase of power to be supplied is remarkable. As the result, the thickness of the first clad layer is preferably not more than 40 μm, and more preferably not more than 15 μm.

Next, in the case of a 2×2 optical device (optical switch of a 2-input and 2-output type), the relation between the width of an optical waveguide and the width of an electrode in a preferred embodiment of the present invention is described with reference to FIGS. 17 to 19 in comparison with the conventional optical device.

Figure 17:
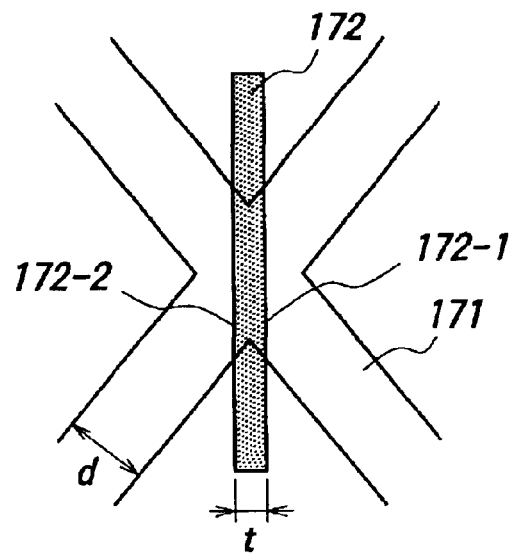
FIG. 17 is a graph for explaining the width of an electrode relative to the width of an optical waveguide in an optical device of the prior art.

In the case of a conventional 2×2 optical device, since a waveguide which has a core layer being comparatively large in sectional area and is remarkably strong in its light confining effect is used, in order to make the excess loss smaller, in FIG. 17 it is necessary to make the thickness t of an electrode 172 arranged in the middle part in the vicinity of a branch waveguide 171, namely, the width t of the electrode 172 to the width d of the waveguide (t/d) comparatively small. In the case that thickness t is small, however, it is difficult to align the electrode 172 with the branch waveguide 171 and the electrode 172 is liable to be broken when a current flows through it.

Figure 18:
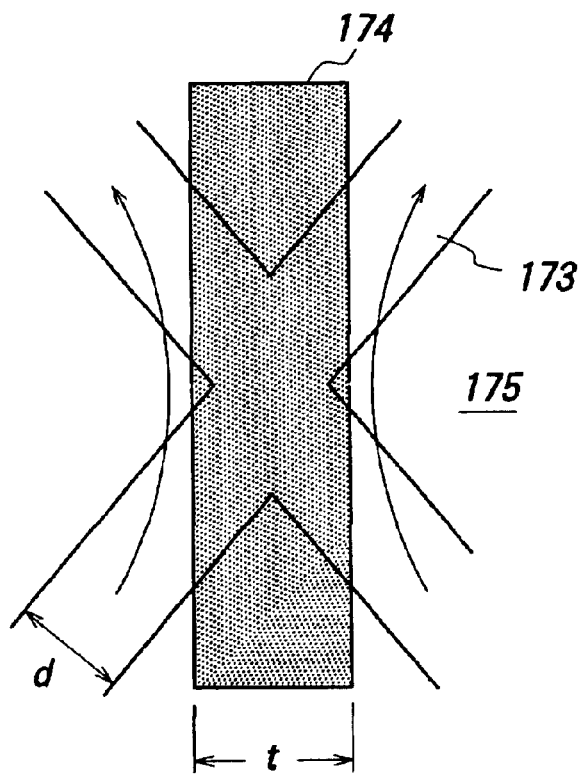
FIG. 18 is a diagram for explaining the width of an electrode relative to the width of an optical waveguide in an optical device according to the present invention.

A preferred embodiment of the present invention switches over light so that it propagates from the branch waveguide 173 through the first clad layer 175 again into the branch waveguide as shown by an arrow by making the width t of the electrode 174 disposed in the vicinity of the branch waveguide 173 shown in FIG. 18, namely, the width t of the electrode 174 to the width d of the waveguide (t/d) comparatively large by means of a single mode optical waveguide which has a core layer comparatively small in sectional area and is not remarkably strong in optical confinement effect.

Figure 19:
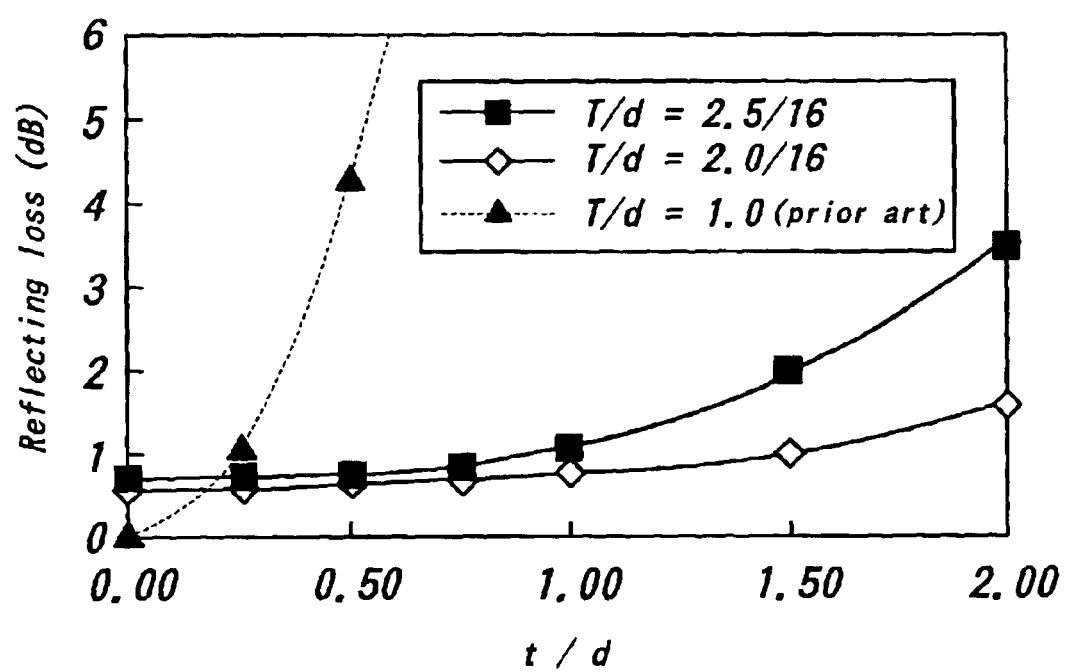
FIG. 19 is a diagram for explaining the relation between the ratio of the width of an electrode to the width of an optical waveguide and a reflection loss in an optical device according to the present invention.

FIG. 19 shows the relation between the reflection loss at the time of a switching operation and the standard value t/d of the width of an electrode in each of 2×2 optical devices of the prior art and the present invention. Here, the shape of a core (: T/d, T: Core thickness) is adopted as a parameter. From FIG. 19, it is known that the optical device of the prior art using an optical waveguide being strong in optical confinement is small in loss in the case that t/d is very small, but remarkably increases in loss as t/d becomes larger. This phenomenon is due to the fact that the electrode ends 172-1 and 172-2 function as total reflection faces for a waveguided light at the time of a switching operation and as t/d becomes larger, the reflected light leaks out to the clad layer to cause a great loss.

On the other hand, in the case of the present invention, when t/d is small, a slight excess loss generates at the time of a switching operation. This is caused by a loss generated in a branch/cross part because of using a single mode waveguide weak in optical confinement. Even if t/d is large, however, the loss can be suppressed to a slight increase. The reason is that in the present invention since there is provided the third clad layer 24 relatively small in refractive index as shown in FIG. 4 for example, the increase of loss is suppressed by a fact that a reflected light which has leaked to the clad area 175 is coupled again to the branch waveguide 173. In the case that t/d is set at not less than 0.2, therefore, the reflection loss can be greatly reduced in comparison with a conventional example.

In the case that the width t of the electrode 174 is larger than a value within a certain range, there is a problem that power consumption of the electrode increases. In a similar way to the case of FIG. 13, when the width of an area functioning as a core layer increases and a light reaches a waveguide at the output side, evanescent waves of the area functioning as a core layer leak out to the waveguide at the output side and thereby the extinction ratio decreases. Therefore, the optimum range of the width t of the electrode 174 depends upon the thickness of the clad layer and the width d of the core layer, and the maximum extinction ratio can be obtained by making the width t of the electrode 174 be not more than three times the width d of the core layer 171.

The present invention is not limited to the above-mentioned embodiments, but can be modified and varied in various ways. For example, the present invention can be applied also to an optical device having one input waveguide, not less than three output waveguides with a branch waveguide for connecting them, an optical device having not less than three input waveguides, one output waveguide with a branch waveguide for connecting them, an optical device having not less than two input waveguides, not less than three output waveguides with a cross waveguide for connecting them, and an optical device having not less than three input waveguides, not less than two output waveguides with a cross waveguide for connecting them.

In the above-mentioned embodiments, the case that a waveguide consists of a single mode waveguide is described, but the case that a waveguide consists of a multimode waveguide can provide a similar effect thanks to the principle of the present invention. In this case, a proper thickness of a clad layer and a proper standard value ΔNs of a refractive index difference are determined according to the material and the dimensions of a waveguide to be formed.

In the above embodiments a cross waveguide, a branch waveguide and a Mach-Zehnder type waveguide are described, but the present invention can be applied also to an optical device of an optional type controlling the variation in phase of light waves or utilizing a total reflection phenomenon.

Further, although the case of utilizing a thermo-optic effect has been described in the above embodiments, the principle of the present invention can be applied also to an optional optical material in a similar way. In the case of utilizing an electro-optic effect or in consideration of the distribution of current densities in the case of utilizing a current injection effect (plasma effect) in a semiconductor, it is enough to determine the refractive index of the third clad layer and the thicknesses of the first and second clad layers in consideration of the distribution of electric field intensities formed between the central electrode and the grounding electrode by a voltage to be applied to the electrodes.

In this case, the central electrode (signal electrode) and the grounding electrode correspond respectively to the first to fourth heater electrodes and the substrate with a heat-sink function, and it is enough to arrange the core layer and the first to third clad layers in a similar way.

What is claimed is:

1. An optical device comprising:
   a core layer defining at least one input waveguide and at least two output waveguides;
   a first clad layer being in contact with said core layer;
   a second clad layer, with said core layer being provided between said first clad layer and said second clad layer;
   a third clad layer with said second clad layer deposited on said third clad layer; and
   at least one electrode for applying a certain voltage or supplying a certain current;
   wherein said core layer, said first clad layer, said second clad layer and said third clad layer comprise a material with a negative refractive index variation coefficient, and said third clad layer has a refractive index smaller than that of said second clad layer, and
   wherein said at least one electrode is positioned such that, when voltage or current is applied thereto, light propagates through only one of said output waveguides.

2. The device according to claim 1, wherein the thickness of said second clad layer is not less than 0.5 μm, and the standard value of the difference between the refractive index of said third clad layer and that of said second clad layer to the refractive index of said second clad layer is not more than −0.1%.

3. The device according to claim 1, wherein the thickness of said first clad layer is 4 to 40 μm.

4. The device according to claim 3, wherein the thickness of said first clad layer is 4 to 15 μm.

5. The device according to claim 1, wherein said third clad layer consists of a plurality of layers different in refractive index from one another.

6. The device according to claim 1, wherein a part of said third clad layer corresponding to the location in which said electrode is arranged is removed and a material with a refractive index larger than that of said third clad layer is embedded in the removed part.

7. An optical device comprising:
   a core layer defining at least one input waveguide and at least two output waveguides;
   a first clad layer, with said core layer being deposited on a part of surface of said first clad layer;
   a second clad layer, with said core layer being provided between said first clad layer and said second clad layer;
   a third clad layer deposited on said second clad layer; and
   at least one electrode for applying a certain voltage or supplying a certain current;
   wherein said at least one electrode is arranged to cross the central axis of said core layer at an acute angle with respect to light propagating through said core layer, and
   wherein said at least one electrode is positioned such that, when voltage or current is applied thereto, light propagates through only one of said output waveguides.

8. An optical device comprising:
   a core layer defining at least one input waveguide and at least two output waveguides;
   a first clad layer, with said core layer being deposited on a part of a surface of said first clad layer;
   a second clad layer, with said core layer being provided between said first clad layer and said second clad layer;
   a third clad layer deposited on said second clad layer; and
   at least one electrode for applying a certain voltage or supplying a certain current;
   wherein said at least one electrode is arranged to cross the central axis of said core layer at an acute angle with respect to light propagating through said core layer,
   wherein the width of said at least one electrode in a direction perpendicular to the central axis of said core layer is not more three times the width of said core layer, and
   wherein said at least one electrode is positioned such that, when voltage or current is applied thereto light propagates through only one of said output waveguides.

9. The device according to claim 8, wherein the width of said electrode in a direction perpendicular to the central axis of said core layer making an acute angle with a light propagating through said core layer is not less than 0.5 times of the width of said core layer.

10. The device according to claim 1, wherein said core layer has a single mode optical waveguide.

11. The device according to claim 1, wherein said core layer has a single mode optical input waveguide, a single mode branch/cross optical waveguide and a single mode optical output waveguide,
   said electrode is a rectangular electrode disposed in the vicinity of the central part of said single mode branch/cross optical waveguide, the width of said electrode is not less than 0.2 times of the width of said waveguide, and said optical device has a function of switching over light so that the light propagates from said single mode branch/cross optical waveguide through said first clad layer again into said single mode branch/cross optical waveguide.

12. The device according to claim 1, wherein said core layer has a single mode optical input waveguide, a single mode branch/cross optical waveguide and a single mode optical output waveguide, said electrode is a rectangular electrode disposed in the vicinity of the central part of said single mode branch/cross optical waveguide, the width of said electrode is not more than 3 times of the width of said waveguide, and said optical device has a function of switching over light so that the light propagates from said single mode branch/cross optical waveguide through said first clad layer again into said single mode branch/cross optical waveguide.

13. The device according to claim 1, wherein the horizontal spot size of light propagating through said core layer is not less than 5 $\mu$m.

* * * * *

UNITED STATES PATENT AND TRADEMARK OFFICE
CERTIFICATE OF CORRECTION

PATENT NO. : 6,961,493 B2
DATED : November 1, 2005
INVENTOR(S) : Osamu Mitomi et al.

It is certified that error appears in the above-identified patent and that said Letters Patent is hereby corrected as shown below:

Title page,
Item [75], Inventor, change "Jun Okumura, Nagova" to -- Jun Okumura, Nagoya --.
Item [57], ABSTRACT,
Line 2, add -- a -- before "third".

Column 14,
Line 47, add -- than -- after "more" and before "three".
Line 50, add -- , -- after "thereto" and before "light".

Signed and Sealed this

Twenty-fourth Day of January, 2006

JON W. DUDAS
*Director of the United States Patent and Trademark Office*